United States Patent [19]

Hashikawa et al.

[11] Patent Number: 4,704,999
[45] Date of Patent: Nov. 10, 1987

[54] FUEL INJECTION CONTROL FOR DIESEL ENGINE

[75] Inventors: Atsushi Hashikawa, Okazaki; Nozomi Kitagawa; Tetsuro Kikuchi, both of Nishio, all of Japan

[73] Assignee: Nippon Soken, Inc., Nishio, Japan

[21] Appl. No.: 870,143

[22] Filed: Jun. 3, 1986

[30] Foreign Application Priority Data

Jun. 4, 1985 [JP] Japan ............................... 60-119669

[51] Int. Cl.$^4$ .............................................. F02D 41/38
[52] U.S. Cl. ..................................... 123/299; 123/435
[58] Field of Search ......................... 123/299, 300, 435

[56] References Cited

U.S. PATENT DOCUMENTS

| | | | |
|---|---|---|---|
| 2,470,709 | 5/1949 | MacMillan | 123/435 |
| 3,575,146 | 4/1971 | Creighton et al. | 123/299 |
| 4,216,750 | 8/1980 | Kobayashi | 123/435 |
| 4,601,269 | 7/1986 | Kato et al. | 123/300 |

FOREIGN PATENT DOCUMENTS 56-66449 6/1981 Japan .

Primary Examiner—Andrew M. Dolinar
Attorney, Agent, or Firm—Cushman, Darby & Cushman

[57] ABSTRACT

In a fuel injection control for diesel engine, in order to eliminate engine noise, particularly, the "idling knocking" noise occurring during engine idling, by controlling a pilot injection, a method for controlling the fuel injection includes the steps of: detecting an idling state of the diesel engine, pressure in a combustion chamber, engine rotational speed and crank angle to obtain a reference position; selecting a valve opening pressure of a fuel injection nozzle at a relatively low level when the idling state is detected, thereby setting a two peaks characteristic of a fuel injection rate within an extent of the idling rotational speed; and controlling a pressure increment rate in the combustion chamber to within a predetermined value by changing a fuel injection quantity of a pilot injection.

7 Claims, 13 Drawing Figures

VALVE OPENING PRESSURE : HIGH

VALVE OPENING PRESSURE: INTERMEDIATE

VALVE OPENING PRESSURE : LOW

PILOT INJECTION QUANTITY: SMALL

PILOT INJECTION QUANTITY: OPTIMAL

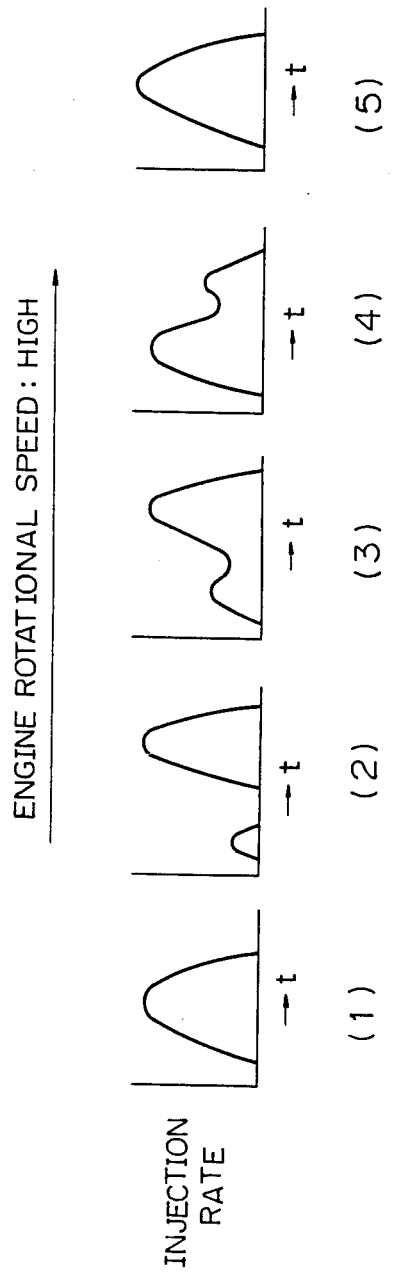

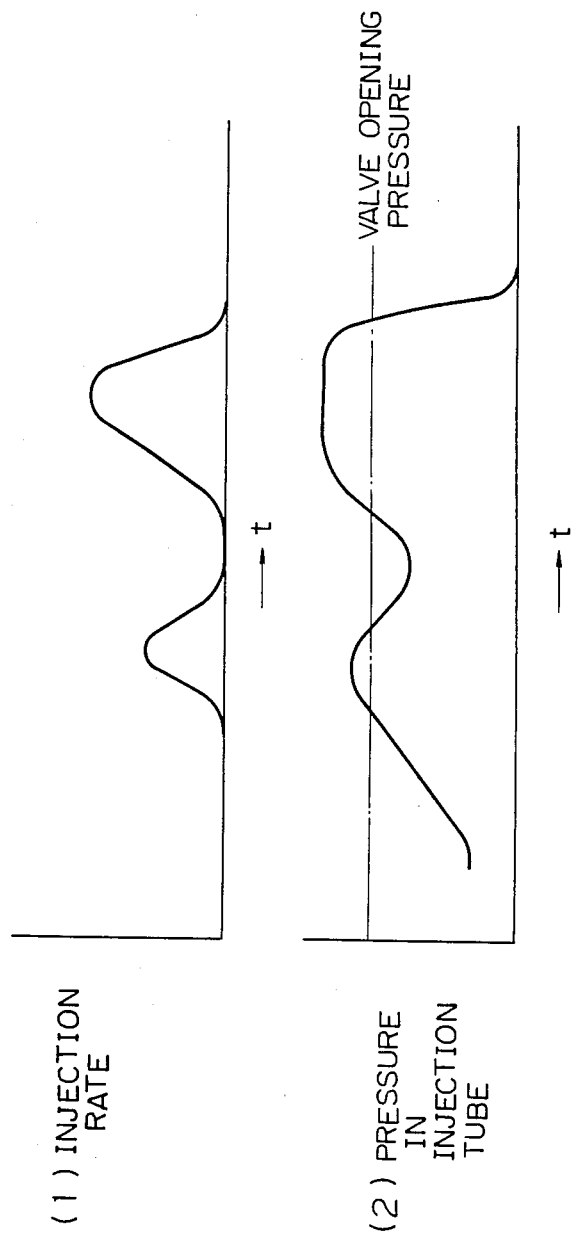

FUEL INJECTION CONTROL FOR DIESEL ENGINE

BACKGROUND OF THE INVENTION

1. Field of the Invention

The present invention relates to a method and an apparatus for controlling a fuel injection for a diesel engine. The method and apparatus according to the present invention are applied to a diesel engine utilizing a pilot injection process.

2. Description of the Related Art

As is well known, a loud engine noise occurs when the diesel engine is idling. This engine noise is caused by combustion and is called "idling knocking". In a conventional technique for eliminating this engine noise, making a pilot injection before a main injection is considered an effective way of preventing this "idling knocking". Although the pilot injection quantity and a non-injection period before the main injection have been improved and optimized, it has been found that the optimal pilot injection quantity and the optimal non-injection period vary in accordance with the Cetane number of a fuel and a temperature of an engine cooling water.

It is very difficult to control these parameters, particularly the Cetane number of the fuel, and accordingly, a satisfactory fuel injection control method and apparatus have not been proposed as yet.

SUMMARY OF THE INVENTION

The object of the present invention is to provide an improved fuel injection control method and apparatus for a diesel engine by which an optimal pilot injection is always made, regardless of the Cetane number of a fuel and temperature of an engine cooling water, by determining values, received from various sensors, i.e., a pressure sensor in a combustion chamber, an engine rotational speed sensor, a crank angle sensor, and an accelerator pedal sensor.

In accordance with the fundamental aspect of the present invention, there is provided a method for controlling fuel injection in a diesel engine, including the steps of: detecting an idling state of the diesel engine, pressure in a combustion chamber, engine rotational speed, and crank angle to obtain a reference position; selecting a valve opening pressure of a fuel injection nozzle at a relatively low level when the idling state is detected, thereby setting two peaks characteristic of a fuel injection rate within an extent of the idling rotational speed; and controlling the pressure increment rate in the combustion chamber to within a predetermined value by changing a fuel injection quantity of the pilot injection.

BRIEF DESCRIPTION OF THE DRAWINGS

In the drawings:

FIG. 8 shows waveforms for explaining a change of injection rate according to engine rotational speed; and, FIG. 9 shows waveforms for explaining a relationship between a two peaks characteristic of the injection rate and pressure in the injection tube.

DESCRIPTION OF THE PREFERRED EMBODIMENTS

A fuel injection control apparatus for a diesel engine utilizing a pilot injection according to the present invention will be explained in detail hereinafter.

Figure 1:
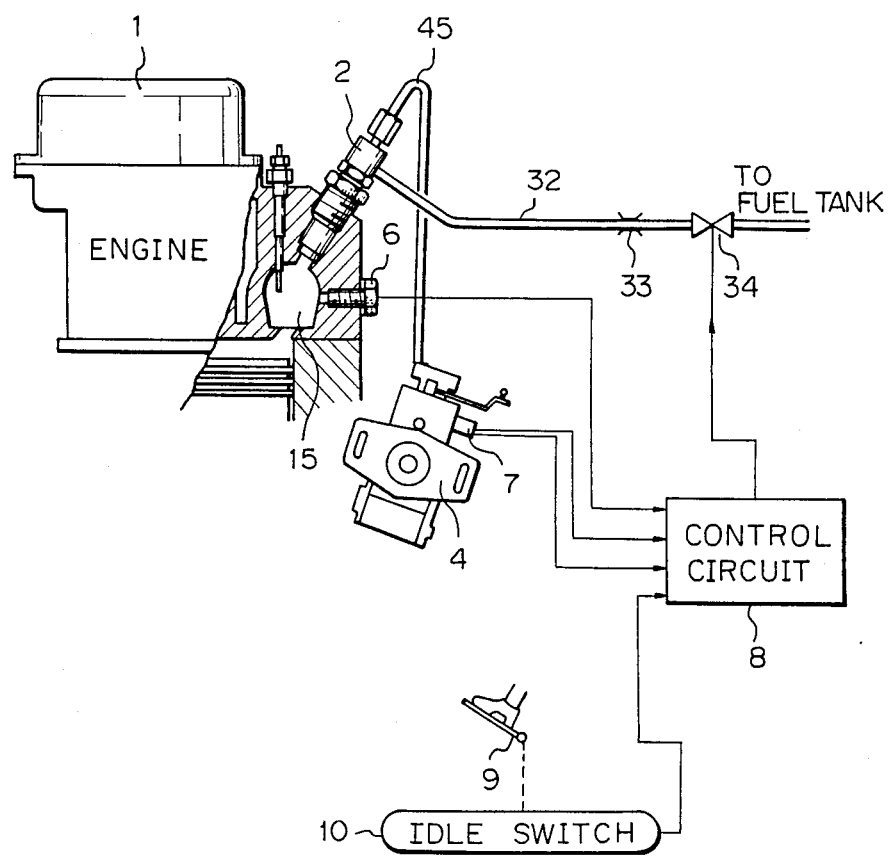
FIG. 1 is a schematic diagram of a diesel engine and an electric control system according to an embodiment of the present invention.

Referring to FIG. 1, reference numeral 1 represents a diesel engine, 2 a fuel injection nozzle, 4 a fuel injection pump, 6 a pressure sensor, 7 an engine rotational speed sensor including a crank angle sensor, 8 an electric control circuit, 9 an accelerator pedal, 10 an idle switch, 15 a combustion chamber, 32 a relief passage, 33 an orifice, 34 a solenoid valve, and 45 an injection tube.

In this structure, pressurized fuel flowing from the fuel injection pump 4 to an injection tube 45 is injected to the combustion chamber 15 through the injection nozzle 2. In this case, the pressure sensor 6 detects a combustion pressure in the combustion chamber 15. Usually, a piezoelectric sensor or a diaphragm displacement detection sensor is used as the pressure sensor. The engine rotational speed sensor including the crank angle sensor 7 is provided at the fuel pump side for a diesel engine. Usually, the speed sensor and angle sensor are incorporated in the fuel pump. The idle switch 10 is provided in the vicinity of an accelerator pedal 9 or at an adjusting lever of the fuel injection pump. When an accelerator pedal 9 is not operated, the idle switch signal indicates a value of "1".

The electric control circuit 8 is constituted by a microcomputer and used for controlling the opening and closing of the solenoid valve 34, based on signals received from the pressure sensor 6, the rotational speed and crank angle sensor 7, and the idle switch 10, after predetermined calculations. The opening and closing of the solenoid valve 34 is performed by an electric current flowing through a solenoid coil 36. In this case, the "ON period" indicates the period in which the solenoid coil is activated by the electric current.

The orifice 33 is provided on the relief passage 32 between the fuel injection nozzle 2 and the solenoid valve 34.

Figure 2:
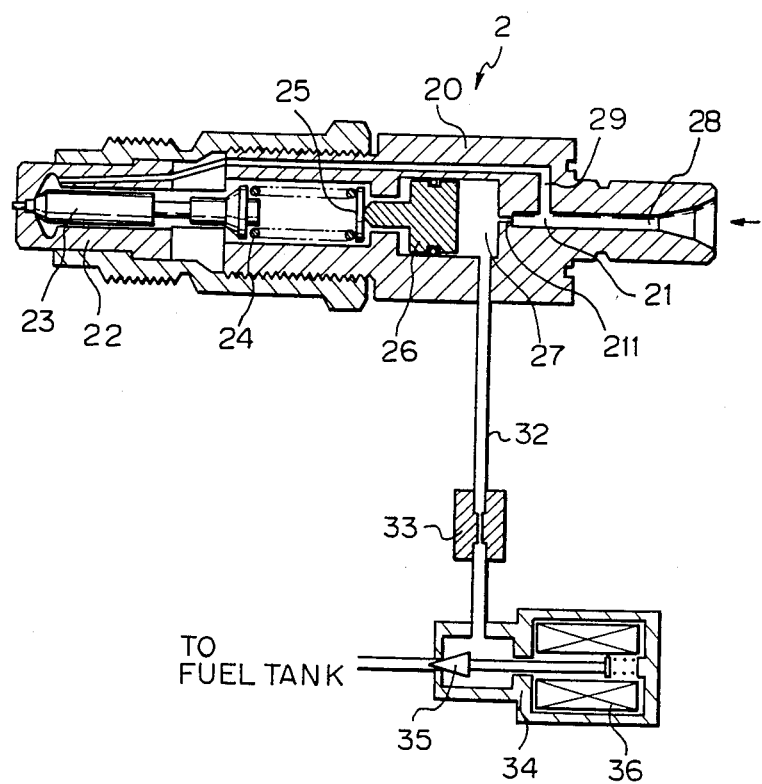
FIG. 2 is a cross sectional view of a fuel injection nozzle and a solenoid valve shown in FIG. 1.

Referring to FIG. 2, reference numeral 20 represents a nozzle holder, 21, 28, and 29 fuel passages 22 a mouth portion at the end of the injection nozzle 2, 23 a nozzle needle, 24 a pressure spring, 25 a pressure plate, 26 a piston, 27 a pressure chamber, and 35 a solenoid needle.

The nozzle valve opening pressure is mainly determined by the strength of the pressure spring 24 against the nozzle needle 23 in the nozzle mouth portion 22. The nozzle valve opening pressure is controlled by the oil pressure of the chamber 27, which is also controlled by the solenoid valve 34. The piston 26 is provided in the pressure chamber 27 and acts on the pressure spring 24 and the pressure plate 25 in response to fuel pressure in the chamber 27. The fuel passage 28 is connected to the injection valve 45 and is branched into two passages 29 and 21. The passage 29 supplies fuel to the nozzle mouth portion 22, and the passage 21 supplies part of the fuel to the pressure chamber 27 through the orifice 211. An orifice 33 is provided between the pressure chamber 27 and the solenoid valve 34 in the relief passage 32. The other end of the solenoid valve 34 is coupled to a fuel tank (not shown) through the needle 35. As explained in FIG. 1, signals from the pressure sensor 6, the engine rotational speed sensor including the crank angle sensor 7, and the idle switch 10 are input to the electric control circuit 8. A control signal is output from the circuit 8 to the solenoid coil 36 in order to control the opening and closing of the valve needle 35.

Figure 3A:
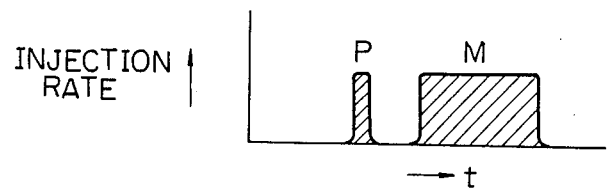
FIGS. 3A to 3C are waveforms for explaining relationships between an injection rate and valve opening pressure in the diesel engine shown in FIG. 1.
Figure 3B:
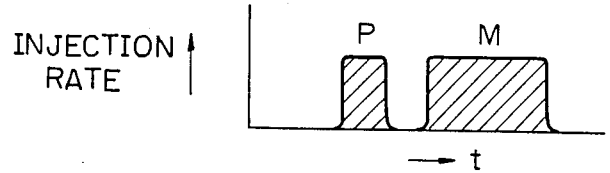
Figure 3C:
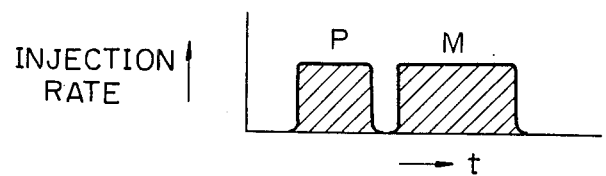

Referring to FIGS. 3A to 3C, the ordinate represents an injection rate and the abscissa represents an injection time t. FIG. 3A shows the case where the valve opening pressure is high; FIG. 3B the case where the pressure is intermediate; and FIG. 3C the case where the pressure is low.

Control of the valve opening pressure is performed by controlling the ON/OFF periods of the solenoid coil 36, based on the signal from the electric control circuit 8. In this case, parameters for controlling the valve opening pressure are obtained from signals received from the pressure sensor 6, the engine rotational speed and crank angle sensor 7, and the idle switch sensor 10, as mentioned above. In FIGS. 3A to 3C, "P" indicates the pilot injection and "M" the main injection. As can be seen from the Figures, a non-injection period occurs between "P" and "M".

Figure 4A:
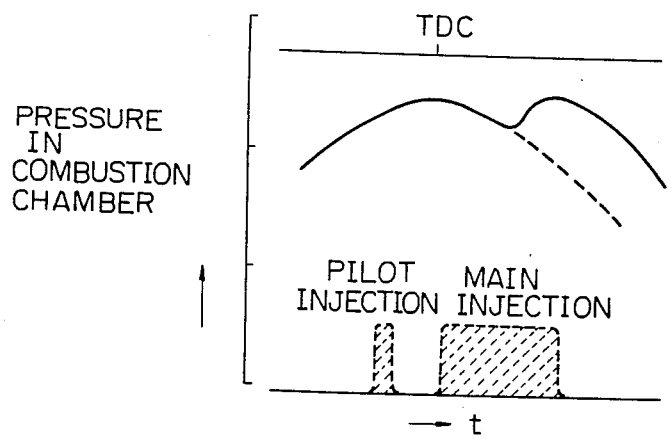
FIGS. 4A to 4C are waveforms for explaining relationships between pressure characteristics in a combustion chamber and pilot injection quantity in the diesel engine shown in FIG. 1.
Figure 4B:
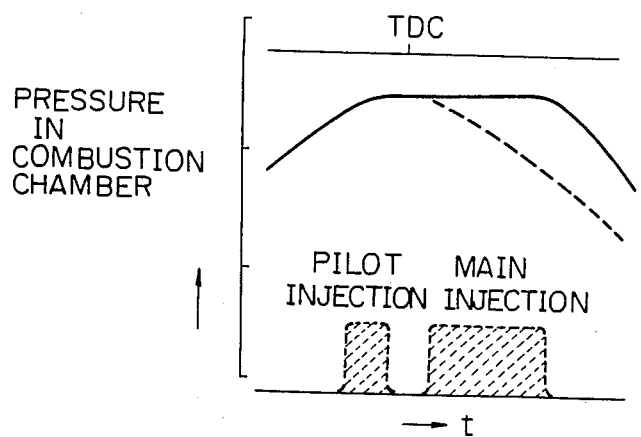
Figure 4C:
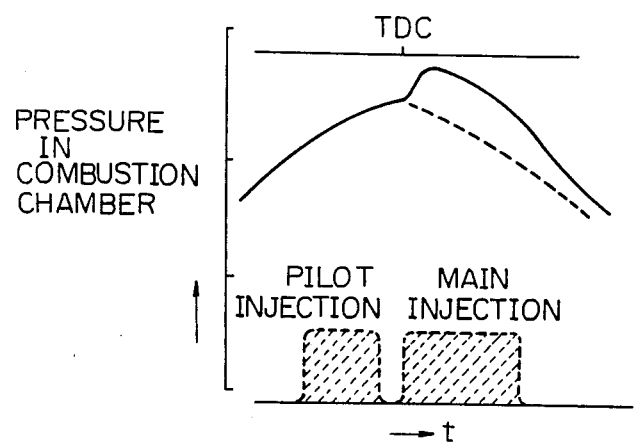

Referring to FIGS. 4A to 4C, the ordinate represents pressure in the combustion chamber 15 and the abscissa represents the injection time t. FIG. 4A shows the case where the pilot injection quantity is small; FIG. 4B shows the optimal quantity; and FIG. 4C shows a large quantity. These FIGS. 4A to 4C correspond to the FIGS. 3A to 3C. In these figures, TDC represents a top dead center of the crank angle. In FIGS. 4A to 4C, a pilot injection is performed before TDC. As shown in FIG. 4A, since the pilot injection quantity is small, a so called "kindling source" cannot be generated in the combustion chamber 15. Accordingly, "ignition lag" is not reduced if a main combustion is carried out as usual. As shown in the graph, pressure in the chamber is increased after ignition, as shown by a second peak caused by "ignition lag". In FIG. 4C, since the pilot injection quantity is too large, the pressure in the chamber is increased by the ignition under the pilot injection. In this case, the crank angle is advanced as a whole, as shown by the peak characteristic, because of an early combustion.

In FIG. 4B, since the pilot injection quantity is optimal, the ignition under the pilot injection is used as the "kindling source" of the combustion in the main injection. Accordingly, the pressure in the chamber is gradually increased (nearly flat characteristic) and combustion is performed with an optimal pressure. Consequently, it is preferable to set the pressure increment rate in the combustion chamber to a small rate, for example, the nearly flat characteristic (gradient zero) as shown in FIG. 4B. Thus, the pilot injection quantity should be controlled to obtain the above mentioned characteristic by controlling the valve opening pressure. When the pressure in the combustion chamber is indicated by a flat characteristic, as shown in FIG. 4B, the engine noise, i.e., "idling knocking", level is minimized.

Figure 5:
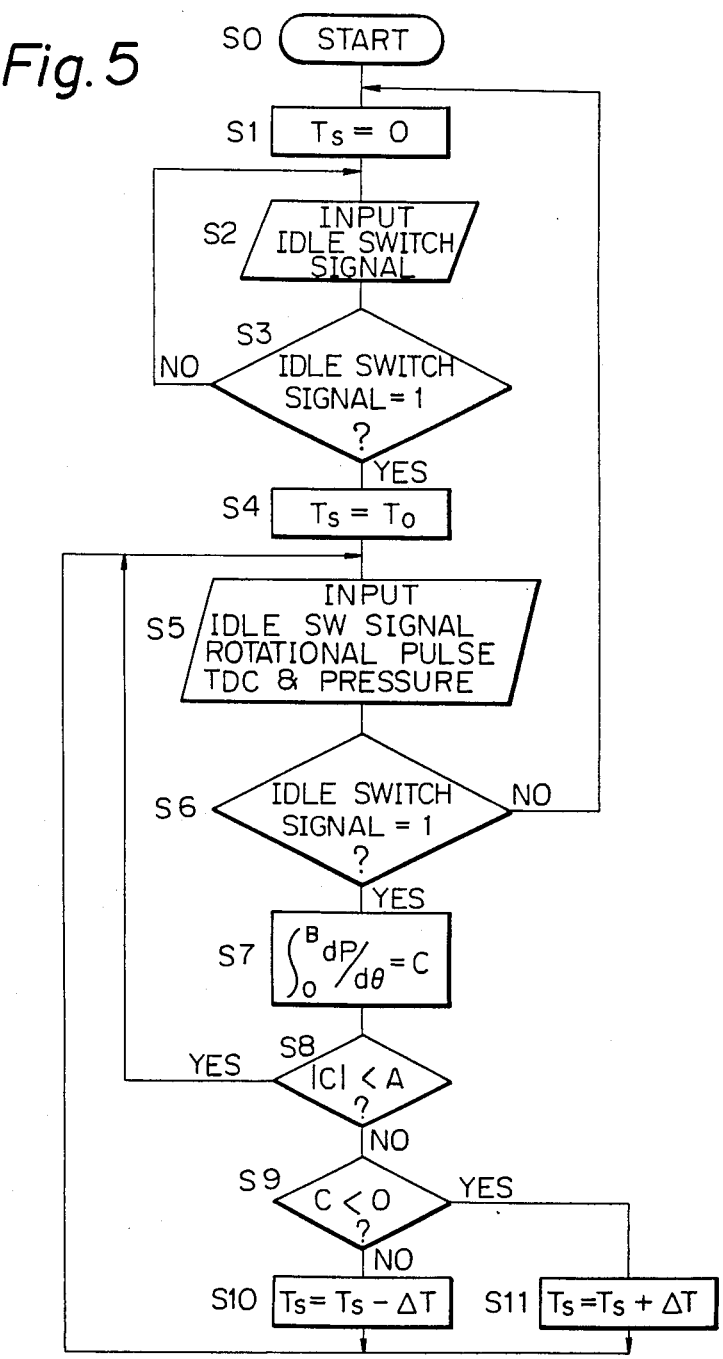
FIG. 5 is a flowchart for controlling a pilot injection quantity based on the ON period of a solenoid valve according to the present invention.

Referring to FIG. 5, when the control of the valve opening pressure is started (step S0), the solenoid ON period (Ts) is set to zero, to obtain a high valve opening pressure (step S1). This means that, since the valve needle 35 is closed, the fuel oil pressure is applied directly to the pressure chamber 27 so that the piston 26 is forced strongly against the pressure plate 25 and the pressure spring 24. Next, an idle switch signal is input (step S2) and it is determined whether or not the engine is idling (step S3). When the idling switch signal is at a level "1", a "during idling" status is indicated. Conversely, a high valve opening pressure is maintained for all states except "idling". When an idling status is detected ("YES", in step S3), the solenoid valve is opened for only a reference time $T_0$ by turning ON the solenoid coil (step S4). Turning ON of the solenoid valve allows a two peaks characteristic of the injection rate to be set to the extent of the predetermined idle rotational speed, as the valve opening pressure is decreased. The idle switch signal, the engine rotational pulse, the TDC signal indicating the reference position of the crank angle, and pressure in the chamber are input to the microcomputer as the electric control circuit 8 (step S5).

When the idle switch signal is "1" (step S6), the pressure increment rate $dP/d\theta$ from the reference signal of the crank angle during a predetermined period is calculated. This value $dP/d\theta$ is integrated, for example, from "0°" to "B°" of the crank angle. "B°" is given by, for example, a 5° crank angle. "$\theta$" represents crank angle. The resultant value "C" is obtained (step S7), and this value "C" is then compared with a permitted limit value "A" for a quiet driving condition. Ideally, this value "A" indicates "zero" because the value "A" is equivalent to the flat portion of the gradient of the injection rate characteristic shown in FIG. 4B.

When an absolute value of "C" is smaller than the permitted limit value "A" ("YES" in step S8), the quiet driving condition is maintained by this valve opening pressure. While, when the value "C" is larger than the value "A" ("NO" in step S8), a positive or negative state of the value "C" is determined (step S9). When the value "C" shows a negative value ("YES" in step S9) as shown in FIG. 4A, the pilot injection quantity is increased by decreasing the value opening pressure. In order to decrease the valve opening pressure, the pressure of the chamber 27 is decreased by releasing fuel in the chamber 27 through the relief passage 32. This "releasing" is performed by setting the ON period of the solenoid valve for a predetermined time (step S11). When the value "C" shows a positive value ("NO" in step S9), the ON period of the solenoid valve is set to a shorter time than the above-mentioned time, to increase the valve opening pressure (step S10). Where, "$\Delta T$" is a increased or decreased time. The pressure increment rate in the combustion chamber 15 is maintained at a constant value by this control routine. Consequently, it is possible to control the injection rate and the pressure in the combustion chamber as shown in FIGS. 3B and 4B.

Figure 6:
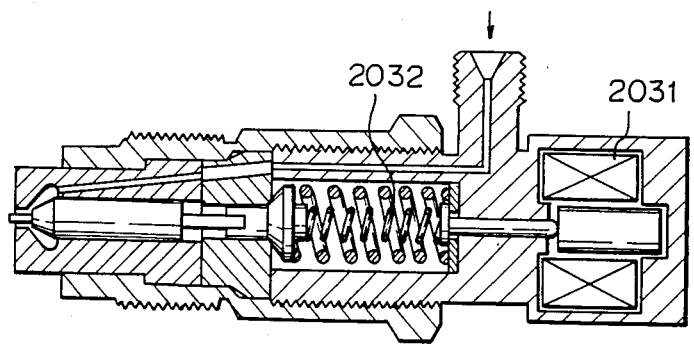
FIG. 6 is a cross sectional view of a fuel injection nozzle and a solenoid valve according to another embodiment of the present invention.
Figure 7:
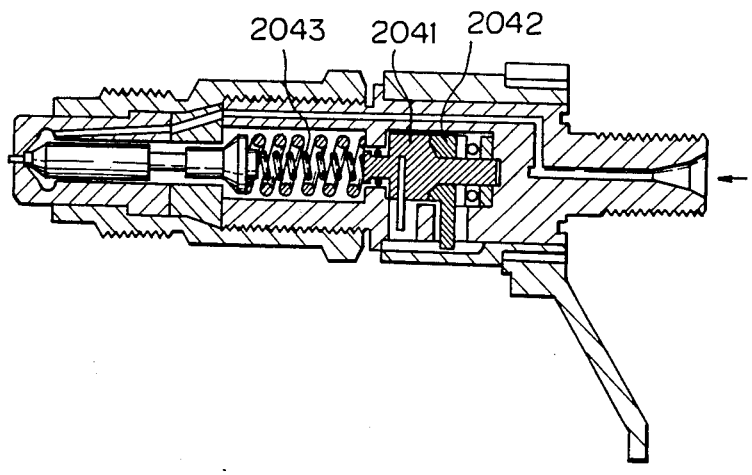
FIG. 7 is a cross sectional view of a fuel injection nozzle according to still another embodiment of the present invention.

FIGS. 6 and 7 show other embodiments of the fuel injection nozzle according to the present invention. Referring to FIG. 6, reference numeral 2031 represents a solenoid valve and 2032 a second pressure spring. As is obvious from the drawing, the solenoid valve 2031 is provided instead of the piston 26 and the pressure chamber 27. The valve opening pressure is controlled by the pressure of the second spring 2032 which is directly driven by the solenoid valve 2031. In this case, the displacement of the solenoid valve 2031 is directly controlled by a driving current flowing in the solenoid coil.

Referring to FIG. 7, the second pressure spring 2043 is directly controlled by two cams 2041 and 2042. In this case, the valve opening pressure is directly controlled mechanically.

Referring to FIG. 8, as is obvious from the drawings, two peaks characteristic of the injection rate are shown in the graphs (2) to (4). Note, engine rotational speed is increased in the right side direction, as shown by the arrows. Usually, the engine rotational speed (Na) in which a two peaks characteristic occurs is given by the following formula.

$$Na \propto P_N \times \frac{1}{V_P} \times \left(\frac{D_1}{D_2}\right)^2$$

where, $P_N$: valve opening pressure of injection nozzle,
$V_P$: plunger velocity,
$D_1$: inner diameter of injection tube,
$D_2$: outer diameter of fuel pump plunger.

As is obvious from the above-formula, since the $V_P$, $D_1$ and $D_2$ can be previously determined and the resultant values are constant, the rotational speed $N_a$ is given only as a function of the valve opening pressure $P_N$. Accordingly, if the pressure $P_N$ can be selected optimally, the engine rotational speed $N_a$ can be set to the vicinity of the idling rotational speed. That is, the two peaks characteristic of the injection rate can be set to the extent of the idling rotational speed.

Referring to FIG. 9, the abscissa shows the injection time t. The ordinate shows the injection rate (1) and the pressure in injection tube (2). The chain dotted line shows the valve opening pressure of the fuel injection nozzle. The two peaks characteristic of the injection rate will be explained below. That is, at the start of the supply of pressurized fuel by the fuel pump plunger, pressure waves are generated in the injection tube 45. These pressure waves are transmitted to the fuel nozzle. When this pressure is smaller than the valve opening pressure, the pressure waves are reflected at the end of the nozzle and returned to the fuel pump side. In the pump side, the pressures therein are superimposed by the returned pressure. Accordingly, the pressure in the injection tube is gradually increased, and when the pressure in the injection tube exceeds the valve opening pressure, the fuel injection is started. In this case, the two peaks characteristic of the injection rate is not found.

Initially, when the pressure is a little larger than the valve opening pressure, the injection nozzle is opened and the fuel injection is started. In this timing, the pressure in the injection tube is decreased temporarily because the fuel injection is performed, and fuel injection is stopped once. However, after a short time, the pressure in the injection tube is increased by the pressure waves transmitted from the fuel pump, and exceeds the valve opening pressure, and at this time, fuel injection is started again. Consequently, the two peaks characteristic is obtained as shown in FIG. 9.

As explained above, since the two peaks characteristic of the injection rate can be set in the extent of the idling rotational speed, it is possible to eliminate the "idling knocking" engine noise and to achieve an optimal quiet driving condition for the diesel engine.

We claim:

1. A method for controlling fuel injection in a diesel engine having a fuel injection nozzle, comprising the steps of:

detecting an idling state of the diesel engine and pressure in a combustion chamber;

obtaining a pressure increment rate from the pressure detected by said detecting step;

selecting a valve opening pressure of said fuel injection nozzle at a relatively low level when the idling state is detected by said detecting step, thereby setting a two peaks characteristic of a fuel injection rate; and controlling said fuel injection nozzle in response to the pressure increment rate so that the pressure increment rate in the combustion chamber is maintained within a predetermined value by changing a fuel injection quantity of a pilot injection from said fuel injection nozzle.

2. An apparatus for controlling fuel injection in a diesel engine having a fuel injection nozzle comprising:

an idling detection means for detecting an idling state of the diesel engine;

a pressure detection means for detecting a pressure in the combustion chamber;

a calculation means for obtaining a pressure increment rate from the detected pressure in the combustion chamber and for integrating a calculated pressure increment rate when the idling state is detected;

a comparison means for comparing a resultant value of said integrated pressure increment rate with a permitted limit value for a quiet driving condition; and a control means for controlling a solenoid valve associated with said fuel injection nozzle based on said comparison data so as to obtain an optimal nozzle valve opening pressure and an optimal pilot injection quantity from said fuel injection nozzle.

3. An apparatus as claimed in claim 2, wherein and idling detection means is an idle switch.

4. An apparatus as claimed in claim 2, wherein said pressure detection means comprises a piezoeleotric element.

5. An apparatus as claimed in claim 2, wherein said calculation means, comparison means, and control means are provided by a microcomputer.

6. An apparatus as claimed in claim 2, wherein said solenoid valve is provided in a fuel return passage from said fuel injection nozzle.

7. An apparatus for controlling fuel injection in a diesel engine having a fuel injection nozzle in which a valve opening pressure is controlled by oil pressure and by a solenoid valve, comprising:

an idle switch (10) associated with an accelerator pedal (9) for detecting an idling state of the diesel engine;

a speed detection sensor (7) for detecting an engine rotational speed;

a crank angle detection sensor (7) incorporated with said speed detection sensor for detecting a crank angle to obtain a reference position of a top dead center (TDC) of the crank angle;

a pressure sensor (6) for detecting a pressure (P) in the combustion chamber, and a control circuit (8) for controlling an opening and closing of the solenoid valve (34) provided in the fuel return passage (32) from the fuel injection nozzle (2), by calculating a pressure increment rate (dP/dθ), integrating a calculated pressure increment rate from zero to a predetermined angle when an idling state is detected, and comparing a resultant value of the integrated pressure increment rate with a permitted limit value (A) for achieving a quiet driving condition, based on signals received from the pressure sensor, the speed detection sensor, the crank angle detection sensor, and the idling switch.

* * * * *